United States Patent [19]
Culpepper et al.

[11] Patent Number: 5,194,747
[45] Date of Patent: Mar. 16, 1993

[54] LIQUID LEVEL GAUGE COMPARING MOLDULATIONS OF INCIDENT AND REFLECTED LOSER BEAMS

[75] Inventors: William X. Culpepper; Richard G. Fenner, both of Houston, Tex.

[73] Assignee: Midland Manufacturing Corp., Skokie, Ill.

[21] Appl. No.: 779,951

[22] Filed: Oct. 21, 1991

[51] Int. Cl.⁵ .................... G01N 15/06; G01C 3/08
[52] U.S. Cl. ............................. 250/577; 356/5; 340/619
[58] Field of Search .............. 356/5; 250/577, 561, 250/560; 73/293; 340/619; 385/12

[56] References Cited

U.S. PATENT DOCUMENTS

| | | |
|---|---|---|
| 4,119,860 | 10/1978 | Gooley . |
| 4,247,784 | 1/1981 | Henry . |
| 4,427,132 | 1/1984 | Thomson . |
| 4,524,282 | 6/1985 | King . |
| 4,560,270 | 12/1985 | Wiklund et al. ............ 356/5 |
| 4,689,489 | 8/1987 | Cole ............................ 250/577 |
| 4,692,023 | 9/1987 | Ohtomo et al. .............. 356/5 |
| 4,786,176 | 11/1988 | Froome ...................... 356/5 |
| 4,938,590 | 7/1990 | Ishida . |
| 4,942,306 | 7/1990 | Colbourne . |
| 4,963,731 | 10/1990 | King . |

FOREIGN PATENT DOCUMENTS

| | | | |
|---|---|---|---|
| 0205521 | 8/1988 | Japan ........................ | 250/577 |
| 8303135 | 9/1983 | World Int. Prop. O. ........ | 250/577 |

Primary Examiner—David C. Nelms
Assistant Examiner—Michael Messinger
Attorney, Agent, or Firm—Emrich & Dithmar

[57] ABSTRACT

A laser liquid level gauge for detecting the level of the surface of a fluid in a vessel includes an optical unit in the top wall of the vessel and a remotely located control unit. A laser diode at the control unit is amplitude modulated with a frequency tone to produce an incident beam which is carried by a fiber optic cable to the optical unit where it is directed through collimating optics to the fluid boundary. Reflections of the incident beam from the fluid boundary are focused by receiver optics to a photodiode at the optical unit, the output of which is coupled by a cable to the control unit, which includes a phase detector for comparing the phase of the modulation tone with that of the detection signal to produce a level indicating signal for display.

12 Claims, 2 Drawing Sheets

5,194,747

LIQUID LEVEL GAUGE COMPARING MOLDULATIONS OF INCIDENT AND REFLECTED LOSER BEAMS

BACKGROUND OF THE INVENTION

1. Field of the Invention

The present invention relates to level sensing and, more particularly, to electro-optical devices for measuring the distance between a reference level and a variable surface, such as the surface level of liquid in a vessel.

2. Description of the Prior Art

There are various techniques for determining the level of a liquid in a vessel. One category of techniques involves physically measuring the level, such as with a dip stick, a float indicator or the like, but such intrusive techniques entail a number of disadvantages. They occupy space in the vessel, they contact the liquid in the vessel with the risk of either contaminating it or being contaminated by it, and they may require periodic access to the interior of the vessel. This requires exposing the interior of the vessel to atmospheric pressure and may violate government regulations which prevent venting of the vessel to atmosphere.

Accordingly, there have been developed a number of nonintrusive level gauging techniques. One such technique involves the use of a light beam which is directed to and reflected from the surface of the liquid in the vessel. Such optical level measurement systems typically utilize the angle of reflection of the incident light beam from the surface of the liquid to indicate the distance of the surface from a reference level. Typically the difference in incidence and reflection angles between full and empty vessels is very small and, therefore, accurate level measurement requires very precise mounting of the optical equipment, which can entail significant expense.

SUMMARY OF THE INVENTION

It is a general object of the present invention to provide an improved optical liquid level gauge system which avoids the disadvantages of prior systems while affording additional structural and operating advantages.

An important feature of the invention is the provision of an optical liquid level gauge apparatus which does not require extremely precise mounting of the optical equipment.

In connection with the foregoing feature another feature of the invention is the provision of a gauge apparatus of the type set forth, which does not depend on differences in incidence or reflection angles for measuring the liquid level.

Another feature of the invention is the provision of a gauge apparatus of the type set forth which is of relatively simple and economical construction and, yet, is quite accurate.

In connection with the foregoing feature, another feature of the invention is the provision of a gauge apparatus of the type set forth, which includes a vessel-mounted unit and a remote unit interconnected by a transmission medium.

These and other features of the invention are attained by providing apparatus for measuring the level of a light-reflective fluid boundary in a vessel relative to a reference level, comprising: source means for generating a light beam, modulation means coupled to the source means for modulating the light beam with a reference signal to produce an incident beam, transmitter means optically coupled to the source means for directing the incident beam from the reference level to the fluid boundary, detector means at the reference level for detecting modulated reflections of the incident beam from the fluid boundary, and means comparing the modulation of the incident beam with that of the detected reflections to produce a level signal indicative of the distance between the reference level and the level of the fluid boundary.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
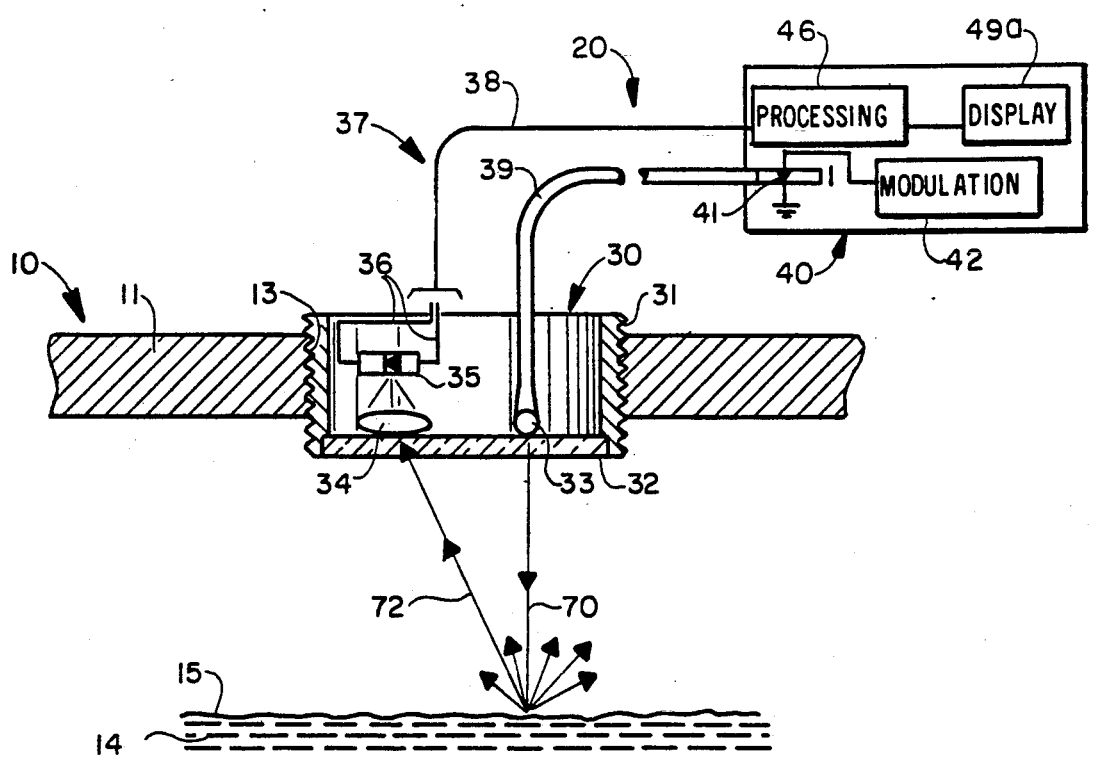
FIG. 1 is a fragmentary sectional view of a portion of a liquid-containing vessel and liquid level measuring apparatus constructed in accordance with a first embodiment of the present invention, with a portion of the apparatus being illustrated in section and a portion being illustrated in a functional block diagrammatic form.

Referring now to FIG. 1 there is illustrated a vessel, generally designated by the numeral 10, which may in the nature of a tank or the like for containing a volume of liquid. The vessel 10 may be of any desired size and shape, and has a top wall in which is formed an internally threaded opening 13. The vessel 10 contains a volume of liquid 14 having a surface 15, the level of which is to be measured relative to a reference level which corresponds substantially to the inner surface of the top wall 11 of the vessel 10. The surface 15 of the liquid 14 is the interface between the liquid and a gaseous phase above the liquid, which may be air or vapor, this interface being light-reflective, in a known manner.

The present invention includes a gauge system, generally designated by the numeral 20, for measuring the distance between the reference level and the level of the liquid surface 15. The gauge system 20 includes an optical unit 30 and a control unit 40 remote from the optical unit 30 and coupled thereto by a transmission means 37. The optical unit 30 includes a housing 31, which may be in the form of a cylinder which is externally threaded for threaded engagement in the opening 13 in the top wall of the vessel 10. The housing 31 is closed at its lower end by a transparent window 32, and may be closed at its upper end by a suitable wall (not shown).

Disposed within the housing 31 are transmitter optics 33, which are designed for collimating and focusing a laser beam onto the liquid surface 15 in a substantially vertical direction. Also disposed in the housing 31 is receiver optics 34, which is designed for focusing light reflected from the liquid surface 15 onto a photodiode 35, which converts the reflected light to an electrical detection signal. The terminals of the photodiode 35 are connected by conductors 36 to the transmission means 37 and, more particularly to a cable 38, which may be a coaxial cable, the other end of which is coupled to the control unit 40. The transmitter optics 33 is optically coupled to one end of a fiber optic cable 39, the other end of which is similarly coupled to the control unit 40. If desired, the transmitter and receiver optics 33 and 34 could be arranged in a coaxial configuration instead of the side-by-side arrangement shown.

Figure 3:
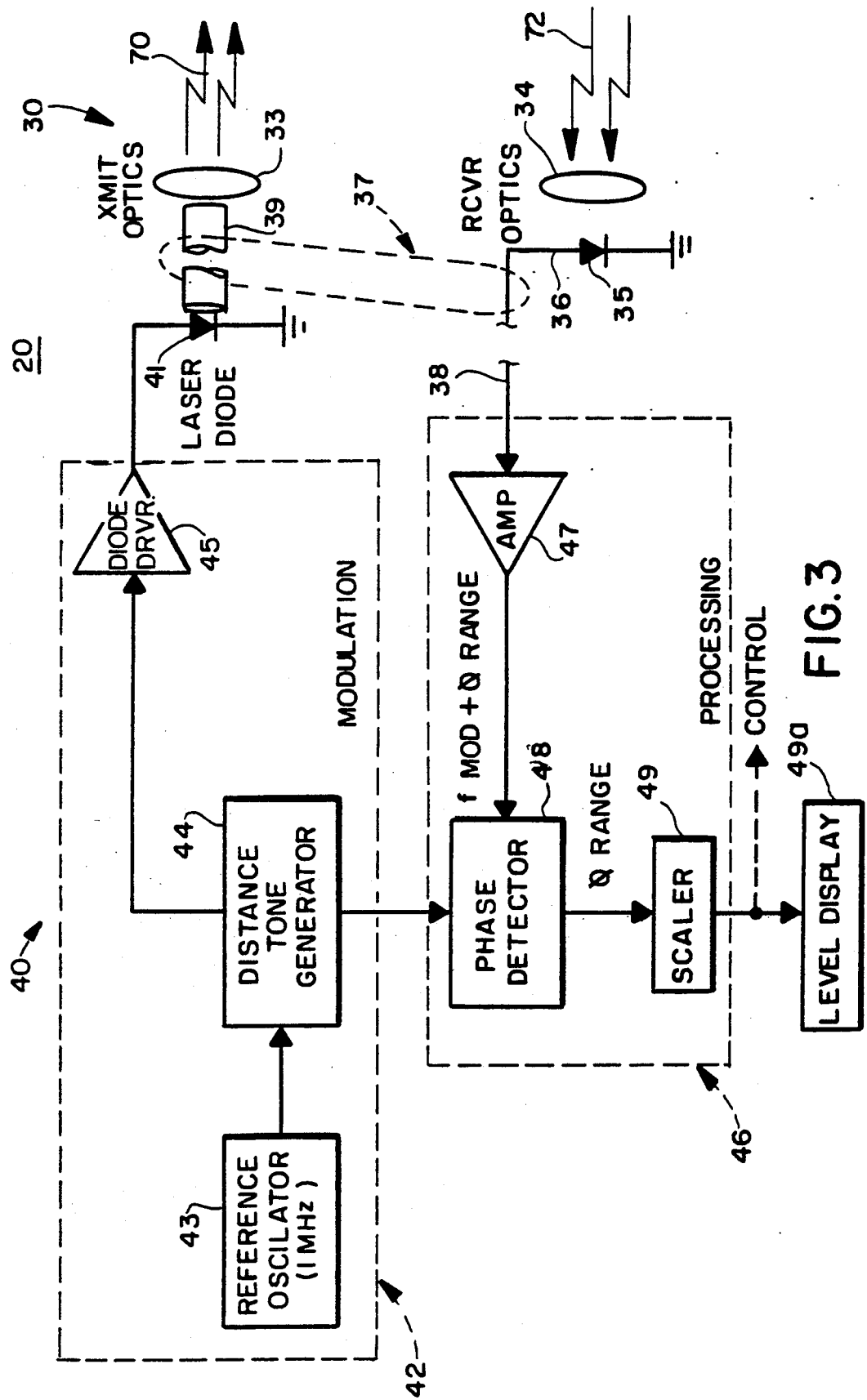
FIG. 3 is a functional block diagrammatic view of the liquid level measuring apparatus of FIG. 1.

Referring also to FIG. 3, the control unit 40 includes a laser diode 41 which is coupled to a modulation circuit 42 for amplitude modulating the laser beam emitted by the laser diode 41. More specifically, the modulation circuit 42 includes a reference oscillator 43, which outputs a predetermined frequency, such as 1 MHz, to a tone generator 44, which generates a modulating tone and applies it to a diode drive amplifier 45. The drive amplifier applies the modulating signal along with a DC bias to the laser diode 41. It will be appreciated that the modulation circuit 42 modulates the laser output of the laser diode 41, at the frequency of the signal emitted by the tone generator 44, thereby imparting modulation information to the laser beam and creating a modulated incident beam which is coupled through the fiber optic cable 39 to the optical unit 30.

The control unit 40 also includes processing circuit 46, which includes an amplifier 47, the input of which is coupled to the cable 38 for receiving electrical signals from the optical unit 30. The output of the amplifier 47 is coupled to one input of a phase detector 48, the other input to which is coupled to the tone generator 44 for receiving therefrom the modulation tone which modulates the output of the laser diode 41. The output of the phase detector 48 is coupled through a scaler 49 to a level display 49a.

In operation, the modulated laser beam is collimated and focused by the transmitter optics 33, which directs it substantially vertically downwardly to the liquid surface 15, as an incident beam 70, illustrated in FIG. 1. When the incident beam 70 intercepts the liquid surface 15, it is back scattered therefrom, as indicated by the upwardly directed arrows in FIG. 1, a portion of the back scattered or reflected light being intercepted as reflections 72 by the receiver optics 34 in the optical unit 30. This received reflected light is focused by the receiver optics 34 onto the photodiode 35, which responds thereto to generate an output detection signal, which is then applied to the processing circuitry 46 over the cable 38.

It will be appreciated that the reflections 72 from the liquid surface 15 contain the same frequency of amplitude modulation as the incident beam 70, and the detection signal generated by the photodiode 35 also contains this modulation information. However, when the modulated detection signal reaches the phase detector 48, it is out of phase with the original modulation signal emitted by the tone generator 44. The difference in phase is directly proportional to the distance between the liquid level 15 and the reference level at the top wall 11 of the vessel 10. This phase difference is detected by the phase detector 48, which generates an output signal indicative of this distance. This output signal is applied through the scaler 49, which directly indicates the level of the liquid surface 15 relative to any selected arbitrary reference. If desired, this scaled signal may be displayed on the level display 49a in any desired manner. While an analog phase detector 48 is illustrated it will be appreciated that a digital implementation could also be utilized.

The output of the scaler 49 may also be utilized as a feedback control signal, such as for controlling apparatus for filling or emptying the vessel 10. For example, when the liquid level in the vessel 10 reaches a predetermined level, either the filling or the emptying operation may be automatically terminated by the feedback signal. Alternatively, the output of the scaler 49 could be used to control other related operations.

It will be appreciated that, in FIG. 1, the diameter of the optical unit housing 31 is shown greatly exaggerated in comparison to the distance between the top wall 11 and the liquid surface 15, for ease of illustration. Similarly, therefore, it will be appreciated that the angle between the incident beam 70 and the reflection 72 is also shown greatly exaggerated. In practice, this angle will typically be very small.

Figure 2:
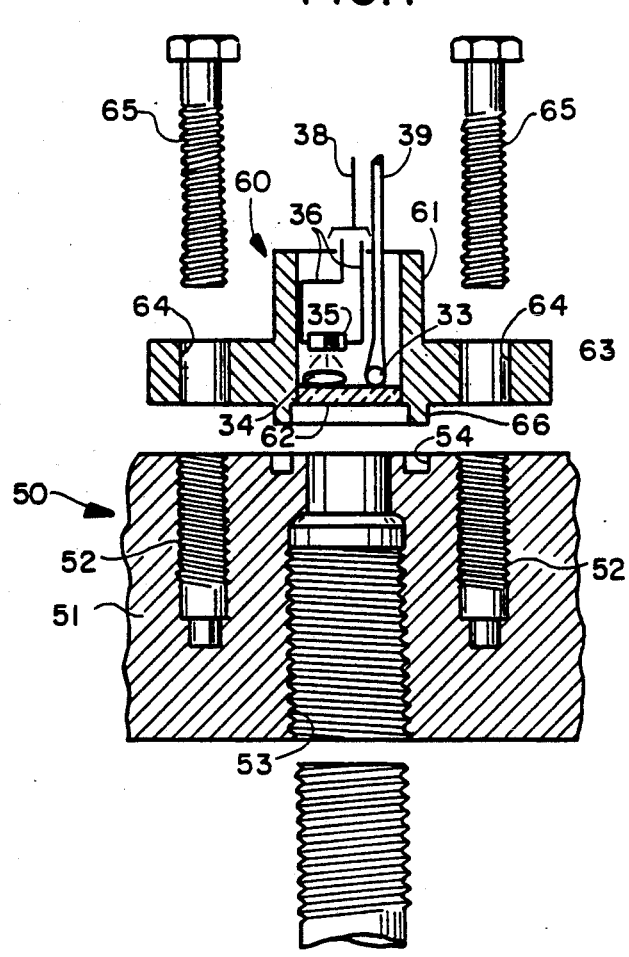
FIG. 2 is a view, similar to FIG. 1, of a portion of a vessel wall carrying a portion of a liquid level measuring apparatus in accordance with a second embodiment of the present invention.

Referring now to FIG. 2, there is illustrated an alternative form of the optical unit for the gauge system 20. More specifically, for this alternative form, there is illustrated a vessel 50 which has a top wall 51 having formed in a circular pattern in the upper surface thereof a plurality of equiangularly spaced-apart, internally threaded bores 52. Also formed through the top wall 51 is an aperture 53. An annular groove 54 may be formed in the outer surface of the top wall 51 coaxially surrounding the aperture 53 and radially inside the pattern of bores 52.

In this embodiment the gauge system 20 includes an optical unit 60 which has a cylindrical housing 61 closed at the lower end thereof by a transparent window 62 and which may, if desired, be closed at the other end thereof by a suitable top wall (not shown). Integral with the cylindrical housing 61 and extending radially outwardly therefrom around the entire circumference thereof is an annular flange 63 having a plurality of screw holes 64 formed therethrough. The screw holes 64 are equal in number to and arranged for respective alignment with the bores 52 when the optical unit 60 is fitted against the top wall 51, so that the optical unit 60 may be fixedly secured to the top wall 51, as by screws 65. Preferably, the housing 61 has depending therefrom a cylindrical centering flange 66 which is receivable in the annular groove 54 for accurately positioning the optical unit 60 on the top wall 51 so that the window 62 is in axial alignment with the aperture 53 in the top wall 51. It will be appreciated that the housing 61 includes the same transmitter and receiver optics 33 and 34 and photodiode 35 as were described above in connection with the optical unit 30.

While, in the illustrated embodiments, the optical units 30 and 60 have been shown as containing the photodiode 35, while the laser diode 41 is disposed in the control unit 40, it will be appreciated that this need not be the case. Thus, alternatively, the photodiode 35 could also be located in the control unit 40 along with the laser diode 41, in which case the transmission means 37 will include two fiber optic cables, since only light would be transmitted between the optical unit 30 and the control unit 40. Alternatively, the laser diode 41 could be located in the optical unit 30 along with the photodiode 35, in which case the optical unit 30 would be coupled to the control unit 40 by electrical cables only.

From the foregoing, it can be seen that there has been provided an improved optical liquid level gauge system which is of relatively simple and economical construction and, yet, provides accurate level measurements which are not determined by the variation in angle between incident and reflected beams and, therefore, do not require extremely precise mounting of the optical components of the system.

We claim:

1. Apparatus for measuring the level of a light-reflective fluid boundary in a vessel relative to a reference level, wherein the vessel has an aperture in the top thereof, said apparatus comprising: an optical unit mountable in the top of the vessel at the reference level; a control unit remote from said optical unit; and transmission means interconnecting said control unit and said optical unit; said control unit including modulation means for generating an output signal containing incident modulation information, said modulation means being coupled to said transmission means for applying said output signal to said optical unit; said optical unit including a housing having a window therein, and means fixedly securing said housing to the top of the vessel with said window in alignment with the aperture; said optical unit further including transmitter means disposed in said housing and coupled to said transmission means and responsive to said output signal for directing to the fluid boundary an incident light beam containing said incident modulation information, and receiver means disposed in said housing for receiving from the fluid boundary reflections of said incident beam and producing an input signal containing reflected modulation information, said receiver means being coupled to said transmission means for applying said input signal to said control unit; said control unit including processing means coupled to said transmission means and to said modulation means for comparing the incident modulation information to the reflected modulation information to produce a level signal indicative of the distance between the reference level and the fluid boundary.

2. The apparatus of claim 1, wherein said optical unit includes a housing threadedly engaged in a complementary opening in the top of the vessel.

3. The apparatus of claim 1, wherein said output signal is a modulated light beam, said modulation means including a light source and means coupled to said light source for supplying thereto the modulation information, said transmission means including fiber optic means for applying the modulated light beam to said optical unit.

4. The apparatus of claim 1, wherein said light source is a laser diode.

5. The apparatus of claim 4, wherein said modulation means includes a tone generator coupled to said laser diode.

6. The apparatus of claim 1, wherein said receiver means includes a photodiode for producing an electrical input signal, said transmission means including electrical conductor means for coupling said electrical input signal to said control unit.

7. Apparatus for measuring the level of a light-reflective fluid boundary in a vessel relative to a reference level, wherein the vessel has an aperture in the top thereof, said apparatus comprising: an optical unit mountable in the top of the vessel at the reference level; a control unit remote from said optical unit; and transmission means interconnecting said control unit and said optical unit; said control unit including source means optically coupled to said transmission means for generating a light beam, and modulation means coupled to said source means for modulating said light beam with a reference signal to produce an incident beam which is coupled to said transmission means; said optical unit including a housing having a window therein, and means fixedly securing said housing to the top of the vessel with said window in alignment with the aperture; said optical unit further including transmitter means disposed in said housing and coupled to said transmission means for receiving said incident beam and directing it to the fluid boundary, and detector means disposed in said housing and electrically coupled to said transmission means for detecting modulated reflections of said incident beam from the fluid boundary and converting it to a detection signal for application to said transmission means; said control unit further including processing means coupled to said transmission means and to said modulating means for comparing the modulation of the incident beam with that of the detection signal to produce a level signal indicative of the distance between the reference level and the fluid boundary.

8. The apparatus of claim 7, wherein said source means includes a laser diode.

9. The apparatus of claim 8, wherein said modulation means includes a tone generator coupled to said laser diode.

10. The apparatus of claim 7, wherein said processing means includes means for comparing the phase of the incident beam with that of the detection signal.

11. The apparatus of claim 10, wherein said modulation means includes means for amplitude modulating the light beam with a tone of a predetermined frequency.

12. The apparatus of claim 7, wherein said control unit further includes display means coupled to said processing means for displaying said level signal.

* * * * *

UNITED STATES PATENT AND TRADEMARK OFFICE
CERTIFICATE OF CORRECTION

PATENT NO.   : 5,194,747

DATED        : March 16, 1993

INVENTOR(S)  : William X. Culpepper et al.

It is certified that error appears in the above-identified patent and that said Letters Patent is hereby corrected as shown below:

On the title page:
[54] In the title, "MOLDULATIONS" should be --MODULATIONS--; and "LOSER" should be --LASER--.

Signed and Sealed this

Twenty-third Day of November, 1993

Attest:

BRUCE LEHMAN

*Attesting Officer*    *Commissioner of Patents and Trademarks*